United States Patent
Zakharov et al.

(10) Patent No.: US 10,542,159 B1
(45) Date of Patent: Jan. 21, 2020

(54) SYSTEM AND METHOD FOR DIAGNOSING PARTS OF A PRINTING DEVICE TO BE REPLACED BASED ON AN INCIDENT RATE

(71) Applicant: KYOCERA DOCUMENT SOLUTIONS INC., Osaka (JP)

(72) Inventors: Oleg Y. Zakharov, Walnut Creek, CA (US); Hiroyuki Takaishi, Walnut Creek, CA (US); Yuka Matsukawa, Oakland, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/411,991

(22) Filed: May 14, 2019

Related U.S. Application Data

(63) Continuation-in-part of application No. 16/196,286, filed on Nov. 20, 2018, now Pat. No. 10,298,779.

(51) Int. Cl.
*H04N 1/00* (2006.01)
*G03G 15/00* (2006.01)

(52) U.S. Cl.
CPC ......... *H04N 1/00042* (2013.01); *G03G 15/55* (2013.01); *H04N 1/0005* (2013.01); *H04N 1/00068* (2013.01); *H04N 2201/0094* (2013.01)

(58) Field of Classification Search
CPC ........... H04N 1/00002; H04N 1/00007; H04N 1/00029; H04N 1/00042; H04N 1/00055;
(Continued)

(56) References Cited

U.S. PATENT DOCUMENTS 5,533,193 A * 7/1996 Roscoe ............... G06F 11/0733
714/39
6,973,597 B2 * 12/2005 Schroath ............... G06K 15/00
399/18
(Continued)

*Primary Examiner* — Chad Dickerson
(74) *Attorney, Agent, or Firm* — Weiss & Moy, P.C.; Jeffrey D. Moy

(57) ABSTRACT

A method to diagnosis an electro-mechanical part on an image forming device comprising: determining an incident count for a first time interval for the electro-mechanical part; determining a first threshold level for the first time interval; monitoring the electro-mechanical part for a second time interval, wherein the second time interval is a plurality of first time intervals; determining if the incident count for a first portion of the second time interval for the electro-mechanical part equal to or less than the first threshold; determining if the incident count for a second portion of the second time interval for the electro-mechanical part is equal to or less than the first threshold when the incident count for the first portion of the second time interval fails to exceed the first threshold for the electro-mechanical part; determining a maximum incident count for the second portion of the second time interval when the incident count for the second portion of the second time interval exceeds the first threshold for the electro-mechanical part; calculating an error ratio between an average incident count of the first portion of the second time interval and the maximum incident count of the second portion of the second time interval; and marking the electro-mechanical part as needing to be one of repaired or serviced when the error ratio exceeds an error ratio threshold level.

19 Claims, 11 Drawing Sheets

(58) Field of Classification Search
CPC ........... H04N 1/00068; H04N 1/00084; H04N 1/32689; H04N 1/32694; G06F 11/07; G06F 11/22; G06F 11/0733; G06F 11/008; G06F 15/239; G06F 3/121; G06F 3/1234; G03G 15/55; G03G 15/553; G03G 15/5079
USPC .................. 358/1.11–1.18, 2.1; 399/8–32
See application file for complete search history.

(56) References Cited

U.S. PATENT DOCUMENTS

| | | | | |
|---|---|---|---|---|
| 7,992,056 | B2* | 8/2011 | Takeuchi | G06F 11/0724 714/47.2 |
| 2006/0126211 | A1* | 6/2006 | Sasaki | G11B 15/07 360/74.4 |
| 2009/0237705 | A1* | 9/2009 | Ikeda | H04L 12/1868 358/1.14 |
| 2011/0150507 | A1* | 6/2011 | Kim | G03G 15/55 399/31 |
| 2013/0067266 | A1* | 3/2013 | Gearing | G06F 11/008 714/4.1 |
| 2016/0255209 | A1* | 9/2016 | Zakharov | H04N 1/00029 358/1.15 |

* cited by examiner

| Value of paper jam counters: cumulative and daily rate | | | | | | | | | |
|---|---|---|---|---|---|---|---|---|---|
| Day | Location 01 | | | Location 02 | | | Location 03 | | |
| | Total | Diff_01 | Rate | Total | Diff_02 | Rate | Total | Diff_03 | Rate |
| 1 | 30 | 2 | LR | 12 | 3 | LR | 3 | 2 | LR |
| 2 | 33 | 3 | LR | 14 | 2 | LR | 5 | 2 | LR |
| 3 | 43 | 10 | HR | 16 | 2 | LR | 7 | 2 | LR |
| 4 | 55 | 12 | HR | 26 | 10 | HR | 7 | 0 | ZR |
| 5 | 55 | 0 | ZR | 30 | 3 | LR | 7 | 0 | ZR |

| SAMPLING DAY | JAMS IN ONE LOCATION |
|---|---|
| 1 | 15 |
| 2 | 0 |
| 3 | 0 |
| 4 | 0 |
| 5 | 0 |
|  | CUMULATIVE: 15 errors in 5 days |

FIG. 7A

| SAMPLING DAY | JAMS IN ONE LOCATION |
|---|---|
| 1 | 3 |
| 2 | 2 |
| 3 | 5 |
| 4 | 3 |
| 5 | 2 |
|  | CUMULATIVE: 15 errors in 5 days |

FIG. 7B

| Error Counter Per Location | | | |
| --- | --- | --- | --- |
| Day | Location 1 | Location 2 | Location 3 |
| 1 | 0 | 1 | 0 |
| 2 | 0 | 1 | 0 |
| 3 | 1 | 1 | 0 |
| 4 | 1 | 2 | 0 |
| 5 | 1 | 2 | 0 |
| 6 | 0 | 1 | 0 |
| 7 | 1 | 1 | 1 |
| 8 | 1 | 1 | 1 |
| 9 | 2 | 1 | 1 |
| 10 | 2 | 2 | 1 |
| 11 | 2 | 2 | 0 |
| 12 | 2 | 2 | 0 |
| 13 | 1 | 1 | 0 |
| 14 | 2 | 1 | 0 |
| 15 | 2 | 1 | 1 |
| 16 | 3 | 1 | 1 |
| 17 | 3 | 1 | 2 |
| 18 | 3 | 1 | 1 |
| 19 | 2 | 2 | 1 |
| 20 | 3 | 2 | 1 |
| 21 | 3 | 2 | 1 |
| 22 | 3 | 2 | 1 |
| 23 | 3 | 2 | 1 |
| 24 | 4 | 2 | 1 |
| 25 | 4 | 3 | 2 |
| 26 | 4 | 3 | 3 |
| 27 | 4 | 3 | 3 |
| 28 | 10 | 2 | 3 |

FIG. 9

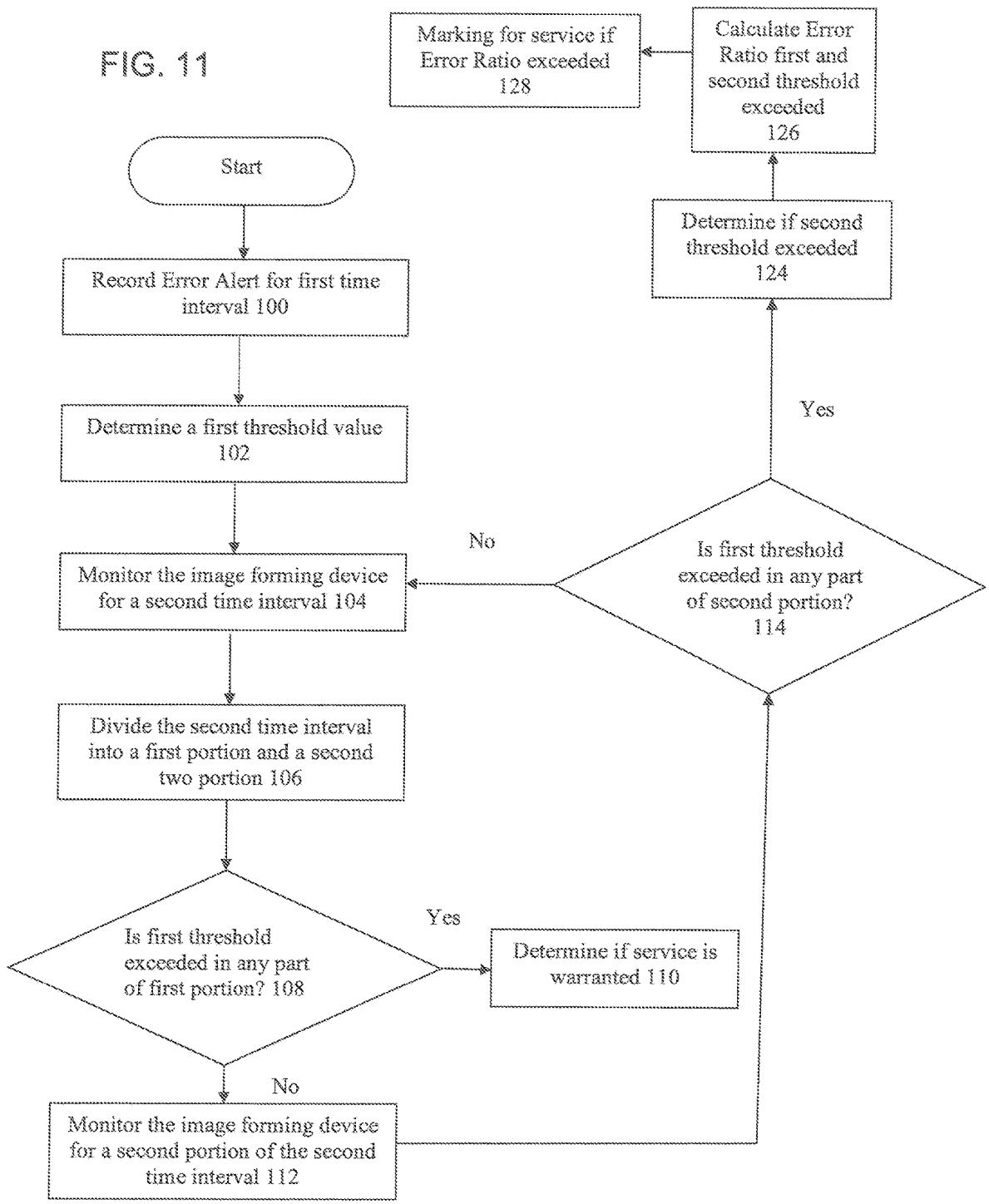

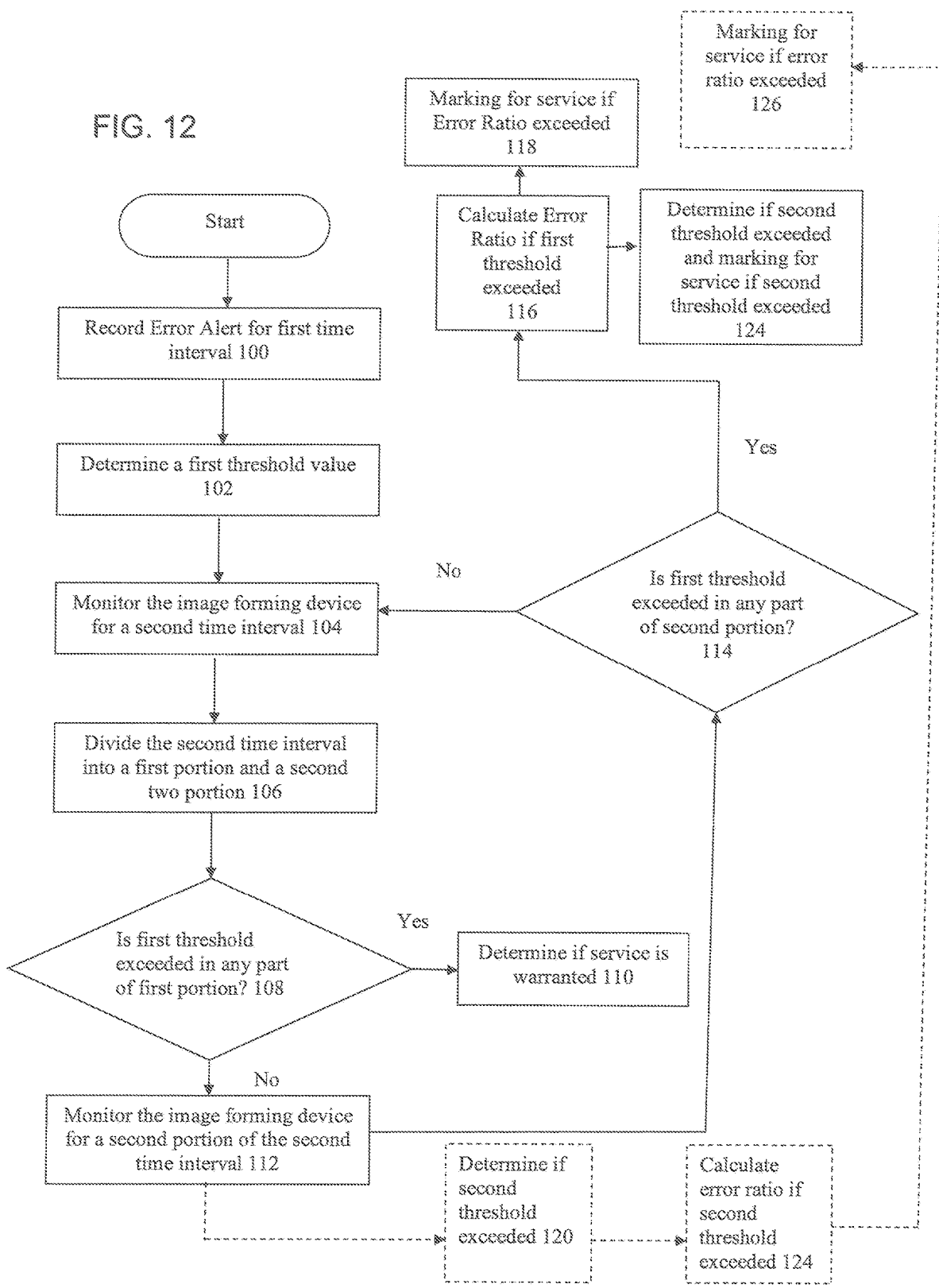

SYSTEM AND METHOD FOR DIAGNOSING PARTS OF A PRINTING DEVICE TO BE REPLACED BASED ON AN INCIDENT RATE

TECHNICAL FIELD

The present application in general relates to printing devices, and more specifically, to a system and method for differential diagnosis of degradative components of a printing device using a logistic regression model, wherein a printing device can be presented with a set of incident counts associated with an electro-mechanical part, the incident counts identifying a level of degradation of the electro-mechanical part.

BACKGROUND

In order to properly maintain image forming devices such as printers, copiers, facsimile, and multi-function peripherals, remote management systems have been designed to collect various items of management information, such as maintenance management information, working state and failure information of the image forming devices. Most remote management systems are networked based. Thus, most image forming devices may be coupled to a communication network so that the connection between the image forming devices and the central management device is established via the network.

The central management device may collect information regarding the image forming device such as the number and kind of prints the image forming device has performed and other aspects of its current state and/or operation. This information may be stored so that historical records of incidents that occur for the image forming device may be maintained. An incident may include a hardware or software issues related to a specific part of the printing devices or a combination of the parts. For instance, a single degraded fuser may trigger often occurred paper jams. In another example, both a degraded output unit and degraded finisher unit may equally affect a rate of incidents because these units are mechanically connected to each other. In this example a threshold will be associated with a combination of an output unit and a finisher unit.

The image forming device needs to be available for normal operations, such as printing, scanning, copying and other functions for as long as possible during a designated time interval with a minimal number of errors. Failure ratios per day or/and per printed page need to be minimized. Some errors, such as paper jams may be caused by one or more degraded mechanical parts of the image forming device and may prevent the normal operation of the image forming device until the image forming device has been serviced.

Some image forming devices after being in service for a predetermined period of time may require maintenance work and/or parts replacement. In cases when the image forming device has a normal work load but produces more errors than it occurred before, the image forming device may need to be marked as a problematic device and maintenance and/or part replacement may need to be scheduled ahead of time. Such cases are different from scenarios where the image forming device's parts are broken, the customer cannot operate the device, and maintenance work may need to be provided on an emergency basis.

Diagnostics of problematic image forming devices may be developed based on information about the amount of errors monitored and the amount of pages printed. Presently, many existing systems use a value of Mean Time Between Failure (MTBF) as a factor to determine a health classification of the system. MTBF may be defined as an expected time between two failures for a repairable system. In general, many industrial devices are operated under similar conditions and the failure rate is pretty much stable and may be "characterized by a relatively constant failure rate". In such cases, a linear regression function may be used to calculate a failure probability, and probability distribution matches criteria of normal distribution, when 99% of cases are covered in interval of 3 normal deviations.

Many industrial machines such as: computer hard drives, gas turbines, electrical motors, and the like may be operated under pretty well controlled environmental conditions, electrical or thermal conditions, rotation speed and other factors. Thus, calculating MTBF as a linear regression function may be used as a predictor for system/component failure. However, image forming devices may operate under very different customer conditions. For example, a work load for an image forming device could differentiate $100s$ of times, from $50$ printed pages per day to 5,000 pages printed per day. In such cases, calculating a 'mean' value may not be accurately used as a classifier of 'problematic' devices.

Therefore, it would be desirable to provide a system and method that overcomes the above. The system and method would allow for differential diagnosis of defective components of an image forming device using a logistic regression model, wherein an image forming device may be presented with a set of incident counts associated with an electro-mechanical part, the incident counts identifying a level of degradation of the electro-mechanical part.

SUMMARY

In accordance with one embodiment, a method to diagnosis an electro-mechanical part on an image forming device is disclosed. The method comprises: determining an incident count for a first time interval for the electro-mechanical part; determining a first threshold level for the first time interval; monitoring the electro-mechanical part for a second time interval, wherein the second time interval is a plurality of first time intervals; determining if the incident count for a first portion of the second time interval for the electro-mechanical part is equal to or less than the first threshold; determining if the incident count for a second portion of the second time interval for the electro-mechanical part exceeds the first threshold when the incident count for the first portion of the second time interval is equal to or less than the first threshold for the electro-mechanical part; determining a maximum incident count for the second portion of the second time interval when the incident count for the second portion of the second time interval exceeds the first threshold for the electro-mechanical part; calculating an error ratio between an average incident count of the first portion of the second time interval and the maximum incident count of the second portion of the second time interval; and marking the electro-mechanical part as needing to be one of repaired or serviced when the error ratio exceeds an error ratio threshold level.

In accordance with one embodiment, a method to diagnosis a mechanical part on an image forming device to be replaced is disclosed. The method comprises: determining an incident count for a first time interval for the electro-mechanical part; determining a first threshold level for the first time interval; monitoring the electro-mechanical part for a second time interval, wherein the second time interval is a plurality of first time intervals; determining if the incident count for a first portion of the second time interval for the electro-mechanical part is equal to or less than the first threshold; determining if the incident count for a second portion of the second time interval for the electro-mechanical part exceeds the first threshold when the incident count for the first portion of the second time interval is equal to or less than the first threshold for the electro-mechanical part; determining a maximum incident count for the second portion of the second time interval when the incident count for the second portion of the second time interval exceeds the first threshold for the electro-mechanical part; calculating an error ratio between an average incident count of the first portion of the second time interval and the maximum incident count of the second portion of the second time interval; and marking the electro-mechanical part as needing to be one of repaired or serviced when the error ratio exceeds an error ratio threshold level.

In accordance with one embodiment, a method to diagnosis a mechanical part on an image forming device to be replaced is disclosed. The method comprises: determining an incident count for a first time interval for the electro-mechanical part; determining a first threshold level for the first time interval; monitoring the electro-mechanical part for a second time interval, wherein the second time interval is a plurality of first time intervals; determining if the incident count for a first portion of the second time interval for the electro-mechanical part exceeds the first threshold by determining the incident count for each first time interval forming the first portion of the second time interval for the electro-mechanical, wherein the incident count is reset to zero at the beginning of each first time interval forming the first portion of the second time interval; determining if the incident count for a second portion of the second time interval for the electro-mechanical part exceeds the first threshold when the incident count for the first portion of the second time interval fails to exceed the first threshold for the electro-mechanical part; determining the incident count for each first time interval forming the second portion of the second time, wherein the incident count is reset to zero at the beginning of each first time interval forming the second portion of the second time interval; selecting one of the first time interval forming the second portion of the second time having a highest incident count greater than the first threshold; calculating an error ratio between an average incident count of the first portion of the second time interval and the maximum incident count of the second portion of the second time interval; and marking the electro-mechanical part as needing to be one of repaired or serviced when the error ratio exceeds a error ratio threshold level.

BRIEF DESCRIPTION OF THE DRAWINGS

The present application is further detailed with respect to the following drawings. These figures are not intended to limit the scope of the present invention but rather illustrate certain attributes thereof.

FIG. 7A-7B are two different charts depicting a number of errors monitored in a location of the image forming device depicted in FIG. 1 according to one aspect of the present application;

FIG. 9 is an exemplary embodiment of a chart depicting monitoring the number of errors recorded over a second time interval according to one aspect of the present application;

FIG. 11 is an exemplary embodiment of a flowchart depicting a method for diagnosing a component part of an image forming device according to one aspect of the present application; and FIG. 12 is an exemplary embodiment of a flowchart depicting a method for diagnosing a component part of an image forming device according to one aspect of the present application.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Embodiments of the exemplary system and method relates to a system and method for differential diagnosis of defective components of an image forming device using a logistic regression model, wherein an image forming device may be presented with a set of incident counts associated with an electro-mechanical part. The incident counts may identify a level of degradation of the electro-mechanical part. The system and method may calculate an incident count for one or more electro-mechanical parts of the image forming device over predetermined time intervals and signal when the number of incident counts exceed a threshold value indicating potential degradation of one or more electro-mechanical parts of the image forming device.

Many types of existing system provide diagnosis or Remaining Useful Life (RUL) time based on calculating Mean Times Between Failure (MTBF). However, such an approach may be too general for specific cases when different image forming devices are operated in different conditions. Average of mean values is not efficient when components of the image forming device may operate under large varieties of workloads, temperature, humidity and other conditions. Embodiments of the present exemplary system and method disclose a system and method of calculating an incident count for one or more electro-mechanical parts of the image forming device over predetermined time intervals and signaling when the number of incident counts exceed a threshold value indicating potential degradation of one or more electro-mechanical parts of the image forming device.

Figure 1:
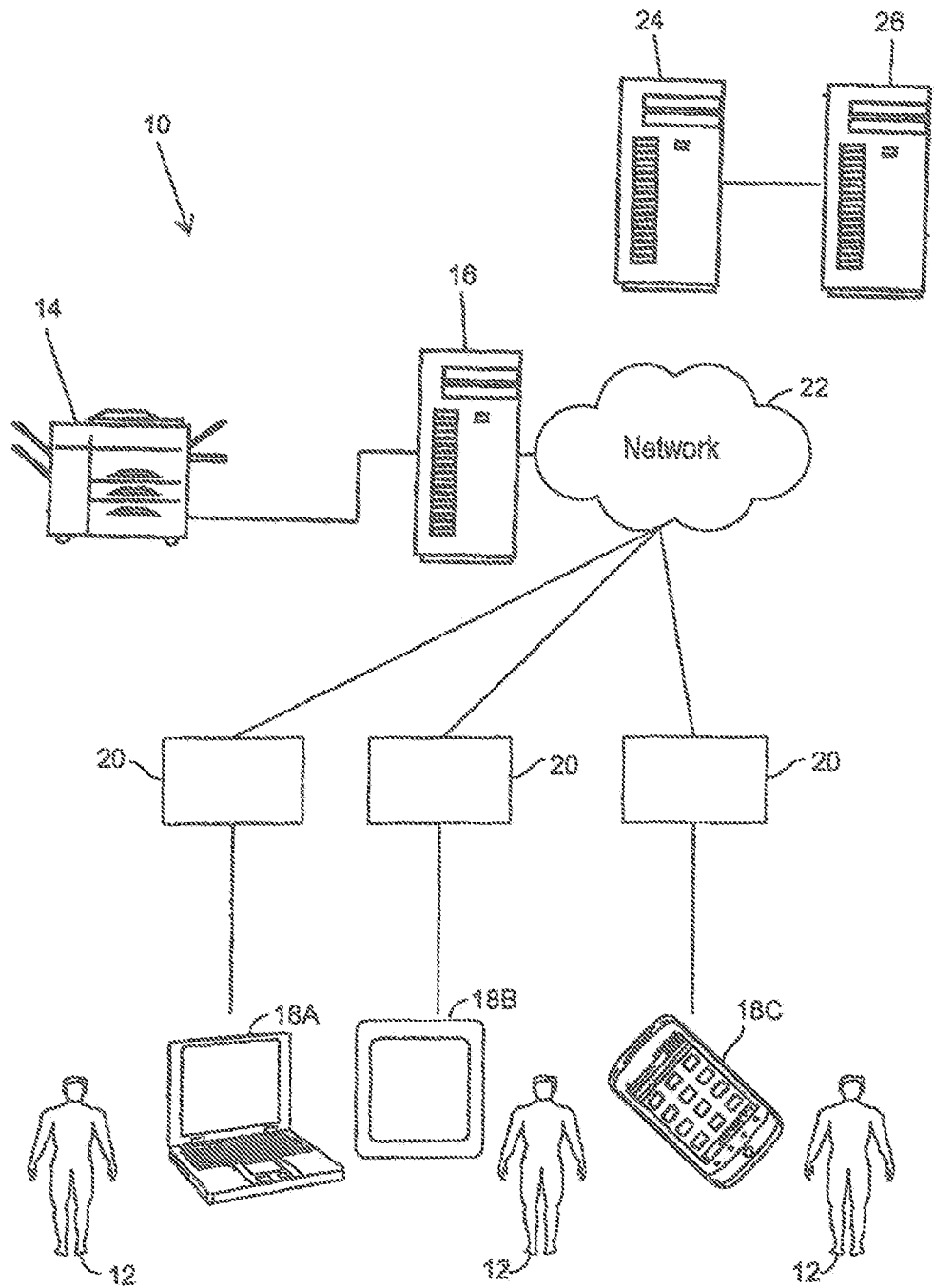
FIG. 1 is a diagram of an exemplary monitoring system according to one aspect of the present application.

Referring now to FIG. 1, a management system 10 (hereinafter system 10) may be shown. The system 10 may monitor one or more image forming devices 14. The image forming device 14 may be any type of device having printing capabilities. For example, the image forming device 14 may be a printer, a copier, a fax machine, a multi-function peripheral including a scanner and one or more of functions of a copier, a facsimile device, and a printer and/or other types of rendering devices. The image forming device 14 may be used for outputting a print job.

The image forming device 14 may be coupled to a print server 16. The print server 16 may be used to connect the image forming device 14 to one or more computing devices 18 over a network 22. The network 22 may be a local area network (LAN), a general wide area network (WAN), wireless local area network (WLAN) and/or a public network. Alternatively, or in addition to, the computing device 18 may be directly coupled to the image forming device 14.

Individuals 12 may use one or more computing devices 18 to send print jobs to the image forming device 14 via a printing application 20 loaded on the computing device 20. The computing devices 18 may send the print jobs directly to the image forming device 14 or through the print server 16. The computing devices 18 may be a client computer system such as a desktop computer, handheld or laptop device, tablet, mobile phone device, server computer system, multiprocessor system, microprocessor-based system, network PCs, and distributed cloud computing environments that include any of the above systems or devices, and the like. The computing device 18 may be described in the general context of computer system executable instructions, such as program modules, being executed by a computer system as may be described below. In the embodiment shown in FIG. 1, the computing device 18 may be seen as a desktop/laptop computing system 18A, a tablet device 18B and a mobile phone device 18C. However, this should not be seen in a limiting manner as any computing device 18 described above may be used.

The system 10 may have a monitoring server 24. The monitoring server 24 may be coupled to the one or more image forming devices 14. The monitoring server 24 may be coupled directly to the image forming devices 14 through the network 22 or may be coupled to the image forming devices 14 through the print server 16 and the network 22. The monitoring server 24 may be used to monitor and record error alerts sent by the image forming devices 14. The error alerts may contain information relating to an issue being experienced by the image forming device 14. The error alert may contain information such as, but not limited to: an error code relating to the type of error, device identifier, time of the error, parts of the image forming device 14 where the error occurred as well as other information pertaining to the error. Based on the information provided in the error alert, the monitoring server 24 may calculate an incident count for a specified time interval and specific device parts. The monitoring server 24 may calculate an incident counts for different errors and error locations on the image forming device 14. For example, the monitoring server 24 may calculate an incident count that occurred each day for a paper jam in a first paper tray, an incident count for a paper jam in a second paper tray, an incident count for a paper jam near a feed door, an incident count for a document misfeed in the document feeder, and the like. Every day, the incident count for each error location may be reset and monitored and recorded again. The incident counts may be different for each part of the image forming device 14 being monitored and for each day being monitored. The above is only given as an example and should not be seen in a limiting manner. The monitoring server 24 may then signal when the number of incident counts related to a specific error and error location exceeds a threshold value indicating potential degradation of one or more electro-mechanical parts of the image forming device 14 as will be discussed below.

In order to calculate an incident count during time intervals, the monitoring server 24 may periodically pull historical records related to the image forming device 14 sending the error alert. The historical records may be stored and processed for each time interval in a local database within the monitoring server 24 and/or on an external database accessible by the monitoring server 24. The monitoring server 24 may be hosted by any party. In accordance with one embodiment, the monitoring server 24 may be hosted by a third-party vendor. For example, the monitoring server 24 may be hosted by a $3^{rd}$ party vendor selling and/or renting the image forming device 14, $3^{rd}$ party vendor responsible for maintaining the image forming device or other vendors associated with the image forming device.

If the monitoring server 24 identifies an issue with the image forming device 14, the monitoring server 24 may send a signal to a ticketing server 26. The ticketing server 26 may be used to processing and generating a ticket in a human-readable format, wherein the ticket includes information on the determined issue and image forming device part inventory code. The ticketing server 26 may register the ticket and schedule a time for the image forming device 14 to be serviced.

Figure 2:
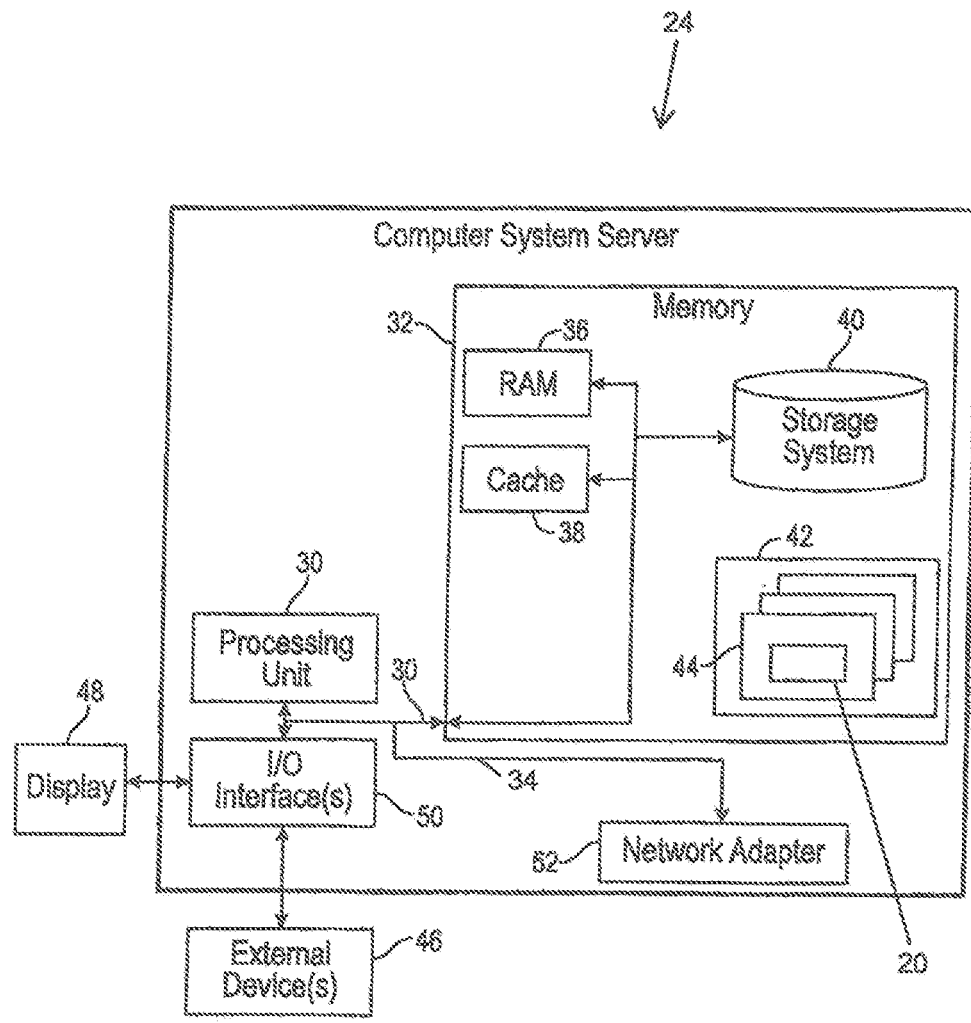
FIG. 2 is a simplified block diagram showing an illustrative server device depicted in FIG. 1 in accordance with one aspect of the present application.

Referring now to FIG. 2, monitoring server 24 may be described in more detail in terms of the machine elements that provide functionality to the systems and methods disclosed herein. The components of the monitoring server 24 may include, but are not limited to, one or more processors or processing units 30, a system memory 32, and a system bus 34 that couples various system components including the system memory 32 to the processor 30. The monitoring server 24 may typically include a variety of computer system readable media. Such media may be chosen from any available media that is accessible by the monitoring server 24, including non-transitory, volatile and non-volatile media, removable and non-removable media. The system memory 32 could include one or more personal computing system readable media in the form of volatile memory, such as a random access memory (RAM) 36 and/or a cache memory 38. By way of example only, a storage system 40 may be provided for reading from and writing to a non-removable, non-volatile magnetic media device typically called a "hard drive".

The system memory 32 may include at least one program product/utility 42 having a set (e.g., at least one) of program modules 44 that may be configured to carry out the functions of embodiments of the invention. The program modules 44 may include, but is not limited to, an operating system, one or more application programs, other program modules, and program data. Each of the operating systems, one or more application programs, other program modules, and program data or some combination thereof, may include an implementation of a networking environment. The program modules 44 generally carry out the functions and/or methodologies of embodiments of the invention as described herein. For example, a program module 44 in the monitoring server 24 may be configured to determine if components of the image forming device 14 needs to be replaced and/or fixed using a logistic regression model.

The monitoring server 24 may communicate with one or more external devices 46 such as a keyboard, a pointing device, a display 48, or any similar devices (e.g., network card, modem, etc.). The display 48 may be a Light Emitting Diode (LED) display, Liquid Crystal Display (LCD) display, Cathode Ray Tube (CRT) display and similar display devices. The external devices 46 may enable the monitoring server 24 to communicate with the image forming device 14 (FIG. 1). Such communication may occur via Input/Output (I/O) interfaces 50. Alternatively, the monitoring server 24 may communicate with one or more networks 22 (FIG. 1) such as a local area network (LAN), a general wide area network (WAN), and/or a public network via a network adapter 52. The monitoring server 24 may be coupled to the one or more networks via a wired or wireless connection. As depicted, the network adapter 52 may communicate with the other components via the bus 34.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, storage system 40) may be utilized. In the context of this disclosure, a computer readable storage medium may be any tangible or non-transitory medium that can contain, or store a program (for example, the program product 42) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Figure 3:
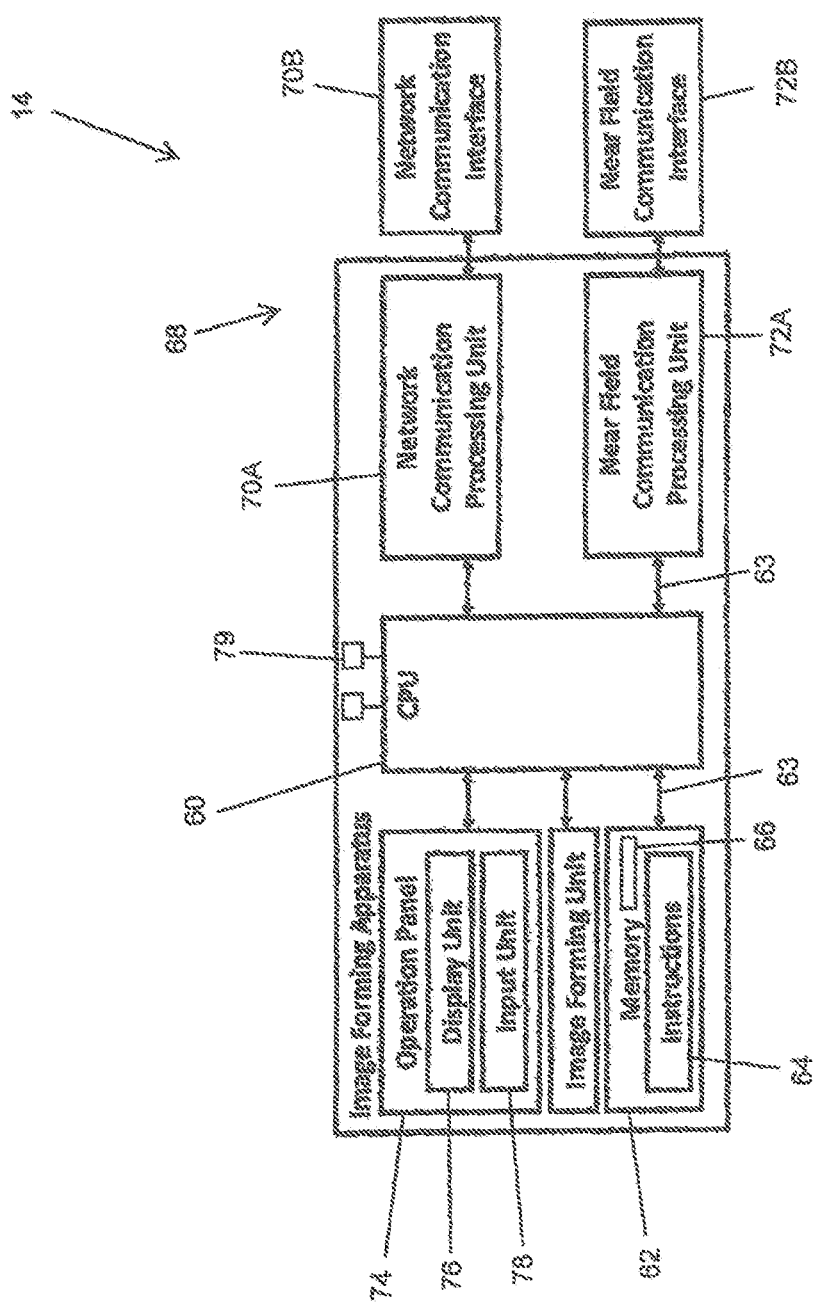
FIG. 3 is a simplified block diagram showing an illustrative image forming device depicted in FIG. 1 according to one aspect of the present application.
Figure 4:
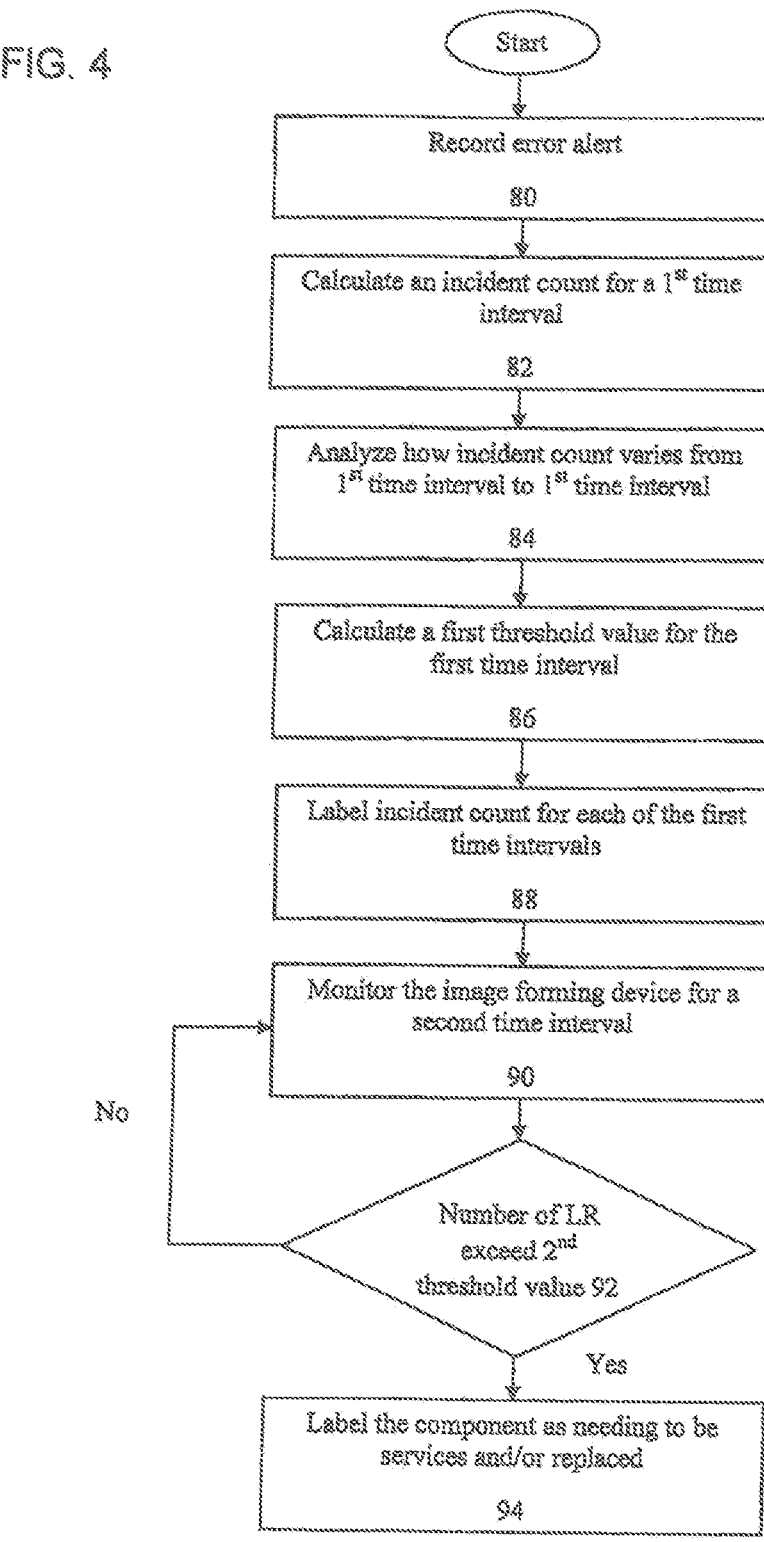
FIG. 4 is an exemplary embodiment of a flowchart depicting a method for diagnosing a component part of an image forming device according to one aspect of the present application.

Referring now to FIG. 3, the image forming device 14 may be described in more detail in terms of the machine elements that provide functionality to the systems and methods disclosed herein. The components of the image forming device 14 may include, but are not limited to, one or more processors or processing units 60, a system memory 62, and a system bus 63 that may couple various system components including the system memory 62 to the processor 60. The image forming device 14 may typically include a variety of computer system readable media. Such media could be chosen from any available media that is accessible by the image forming device 14, including non-transitory, volatile and non-volatile media, removable and non-removable media. The system memory 62 could include one or more image forming device readable media in the form of volatile memory, such as a random access memory (RAM) and/or a cache memory. By way of example only, the system memory 62 may be provided for reading from and writing to a non-removable, non-volatile magnetic media device typically called a "hard drive".

The system memory 62 may include at least one program product/utility 64 having a set (e.g., at least one) of program modules 66 that may be configured to carry out the functions of embodiments of the invention. The program modules 66 may include, but is not limited to, an operating system, one or more application programs, other program modules, and program data. Each of the operating systems, one or more application programs, other program modules, and program data or some combination thereof, may include an implementation of a networking environment. The program modules 66 may include procedures such as a page converter, rasterizer, compression code, page print scheduler, print engine manager, and similar printing applications (i.e., printer firmware). The program modules 66 generally carry out the functions and/or methodologies of embodiments of the invention as described herein.

The image forming device 14 may have one or more communication modules 68. The communication modules 68 may allow the image forming device 14 to communicate with one or more networks (i.e., network 22 shown in FIG. 1) such as a local area network (LAN), a general wide area network (WAN), wireless local area network (WLAN) and/or a public network. In accordance with one embodiment, the communication modules 68 may include a network communication processing unit 70A coupled to a network communication interface 70B. The network communication processing unit 70A and the network communication interface 70B may allow the image forming device 14 to communicate with one or more networks 22. These networks 22 may be a local area network (LAN), a general wide area network (WAN), a wireless local area network, a public network, a cellular network as well as other type of networks. The communication modules 68 may include a near field communication processing unit 72A coupled to a near field communication interface 72B. The near field communication processing unit 72A and the near field communication interface 72B may allow the image forming device 14 to communicate with other electronic devices located near the image forming device 14 using Bluetooth, infrared or similar wireless communication protocols.

The image forming device 14 may include an operation panel 74. The operation panel may include a display unit 76 and an input unit 78 for facilitating human interaction with the image forming device 14. The display unit 76 may be any electronic video display, such as a LCD display, LED display and similar display types. The input unit 78 may include any combination of devices that allow users to input information into the operation panel 74, such as buttons, a keyboard, switches, and/or dials. In addition, the input unit 78 may include a touch-screen digitizer overlaid onto the display unit 76 that can sense touch and interact with the display unit 76.

The image forming device 14 may have one or more sensors 79. Each sensor 79 may be used to monitor certain operating conditions of the image forming device 14. Sensors 79 may be used to indicate a location of a paper jam, document miss-feed, toner level, as well as other operating conditions. The above is given as examples and should not be seen in a limiting manner. Each sensor 79 may be coupled to the processor 60. When a sensor 79 detects an operational issue as may be disclosed below, the sensor 79 may send a signal to the processor 60. The processor 60 may generate an error alert associated with the operational issue. The processor 60 may transmit the error alert to an external device as disclosed below using one of the communication modules 68.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, system memory 62) may be utilized. In the context of this disclosure, a computer readable storage medium may be any tangible or non-transitory medium that can contain, or store a program (for example, the program module 66) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Referring now to FIGS. 1-6, operation of the system 10 in accordance with one exemplary embodiment may be described. When the image forming device 14 experiences certain failures or abnormal situations such as an alarm condition, the image forming device 14 may generate an error alert. The error alert may include a failure code associated with the failure/abnormal situation along with additional information such as date, time and location of the occurrence. The above is given as an example and should not be seen in a limiting manner. Other information related to the failure/abnormal situation may be included other than those listed above.

The image forming device 14 may send the error alert to the monitoring server 24. The monitoring server 24 may record the error alert from the image forming device 14 as shown in 80. The monitoring server 24 may analyze the error alert received as will be disclosed below. While the operation of the system 10 is disclosed as the image forming device 14 providing the error count to the monitoring server 24, in accordance with one embodiment, the image forming device 14 may store and analyze the error statistics within time intervals as disclosed below.

The monitoring server 24 may record and store the type of error and error location of each error message or alert. For example, the image forming device 14 may record a paper jam at a first paper tray, a paper jam at a second paper tray and a third paper jam at a feed door, the monitoring server 24 may record and store this information as three separate paper jams at three different locations and not as three total paper jams. The monitoring server 24 may record, store and analyze this information for a first predetermined time intervals and tally this information. The first predetermined time interval may be a "sampling" time, wherein the monitoring server 24 may sample and collect data from the image forming device 14 as may be described below. The first predetermined time interval may be a day, two days of a week. The above is given as an example and should not be seen in a limiting manner.

The monitoring server 24 may calculate an incident count for a particular component part of the image forming device 14 for the first predetermined time interval as shown in 82. In accordance with one embodiment, the monitoring server 24 may calculate the incident count over multiple first time intervals. For example, the monitoring server 24 may calculate the incident count over successive timeframes. Thus, if the first predetermined time interval is a day, the monitoring server 24 may calculate the incident count over two or more successive days. At the end of each first predetermined time interval, the monitoring server 24 may reset a counter so that the incident count starts again at zero. Thus, as may be seen in FIG. 5, during a first predetermined time interval, i.e. Day 1, the monitoring server 24 recorded 30 incidents at Location 1, 12 incidents at Location 2, and 3 incidents at Location 3. The counter of the monitoring server 24 may then be reset to zero. During the next first predetermined time interval, i.e. Day 2, the monitoring server 24 recorded 33 incidents at Location 1, 14 incidents at Location 2, and 5 incidents at Location 3.

The monitoring server 24 may analyze how the incident count varies from monitored timeframe to timeframe as shown in 84. By analyzing how the incident count increases from monitored timeframe to timeframe, the monitoring server 24 may determine a first threshold value as shown in 86. The first threshold value calculated may be defined as a number of errors recorded for a particular component part of the image forming device 14 for a predetermined timeframe which should not be exceed to indicate healthy operation. The first threshold value may differ for different image forming devices 14 as well as for different components. For example, image forming devices 14 which may offer higher quality images and faster printing speeds may have a lower threshold value than image forming devices 14 which may offer lower quality images and slower printing speeds. The monitoring server 24 may label the incident count associated with the first predetermined time interval as shown in 88. The label associated with the incident count may be based on vicinity of the incident count to the first threshold value. For example, the monitoring server 24 may label the incident count as a high rate (HR) if the incident count monitored for the first predetermined time interval exceeds the first threshold. Similarly, the monitoring server 24 may label the incident count as a low rate (LR) if the incident count is more than 0 but equal to or less than the first threshold value. The monitoring server 24 may label the incident count as a zero rate (ZR) if the incident count is equal to 0.

Figures 5, 6:
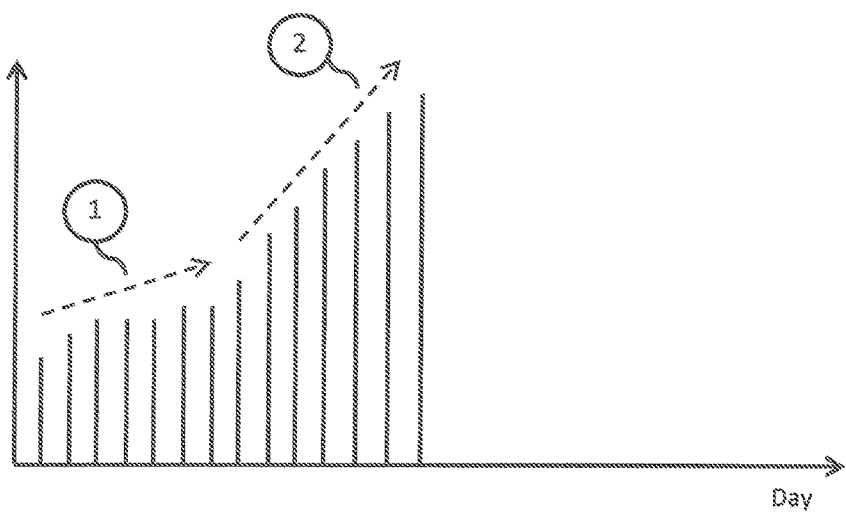
FIG. 5 is an exemplary embodiment of a chart depicting a number of errors monitored in different locations of the image forming device depicted in FIG. 1 according to one aspect of the present application.
FIG. 6 is an exemplary embodiment of a chart depicting monitoring the number of errors recorded in FIG. 5 over a second time interval according to one aspect of the present application.

The monitoring server 24 may continue to monitor the image forming device 14 for a second predetermined time period as shown in 90 (labeled as 1 and 2 in FIG. 6). The second predetermined time interval may be a "cumulative" time interval for collecting first predetermine time interval data. The second predetermined time interval may be comprised of a plurality of first time intervals. The second predetermined time intervals may be a week, two weeks, 20 days, a month or similar time frames.

During the second predetermined time interval, the monitoring server 24 may cumulate a number of first time intervals where the low rate was recorded. The monitoring server 24 may determine as shown in 92 if the number of occurrences of the low rate recorded during the second predetermined time interval exceeded a second threshold value. The second threshold value calculated may be defined as the cumulative number of low rates recorded for a particular component part of the image forming device 14 for a predetermined timeframe which should not be exceed to indicate normal operation. The second threshold value may differ for different image forming devices 14. For example, image forming devices 14 which may offer higher quality images and faster printing speeds may have a lower second threshold value than image forming devices 14 which may offer lower quality images and slower printing speeds. If the number of occurrences of the low rate recorded during the second predetermined time interval exceeded the second threshold value, the monitoring server 24 may mark the electro-mechanical part as needing to be reviewed for either repair and/or service as shown in 94.

As may be seen in FIGS. 5-6, the monitoring server 24 may record and store the type of incident and incident location. In the embodiment shown in FIGS. 5-6, the monitoring server 24 may record and store the total number of incidents at different locations on the image forming device 14 for a plurality of first predetermined time intervals. In the present embodiment, three different electro-mechanical part locations (i.e., Location 1, Location 2 and Location 3) are being monitored. However, this is just being shown as an example and should not be seen in a limiting manner.

At the end of each first predetermined time interval (in the present embodiment, each day), the monitoring server 24 may total the incident count at each location and then label the incident count as a high rate (HR) if the incident count monitored for the first predetermined time interval exceeds the first threshold, as a low rate (LR) if the incident count is more than 0 but equal to or less than the first threshold value or as a zero rate (ZR) if the incident count is equal to 0. It should be noted that each location being monitored may have different first threshold values. The monitoring server 24 may then reset a counter at the end of each first time interval so that the incident count starts again at zero. The monitoring server 14 may then total the different incident counts for a second predetermined time frame (a week in the present embodiment). As may be seen, for Location 1, the monitoring server 24 may record two LR, two HR and one ZR; Location 2 may have four LR and 1 HR; and Location 3 may have 3 LR and 2 ZR. If the second threshold level is three, Location 2 exceeds the second threshold level and may be mark as needing to be reviewed for one of repair or service.

Figure 8A:
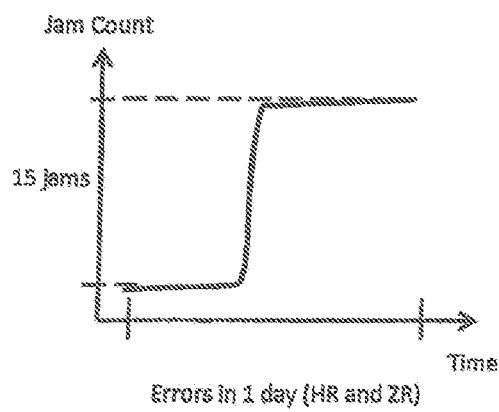
FIG. 8A-8B are two different graphs depicting a sudden number of errors versus monotonic errors monitored in a location of the image forming device depicted in FIG. 1 according to one aspect of the present application.

Due to normal usage, the number of incidents monitored may vary from day to day and from location to location. However, the system 10 is monitoring for monotonic errors rates versus a total error rate to determine a health of the image forming device 14. The difference may be illustrated as shown in FIGS. 7A-7B and 8A-8B. In FIGS. 7A and 8A, the monitoring server 24 may monitor an incident count for an electro-mechanical part each day (first predetermined time interval) for one week (second predetermined time interval). In this example, the electro-mechanical part may experience 15 paper jams on Day 1 but no paper jams the remaining days. Thus, if the first threshold value is 8, the monitoring server 24 may mark Day 1 as a HR and Days 2-5 as ZR. Since no LR days are recorded during the second time interval, the second threshold value may not be reached. Thus, in this example, the monitoring server 24 may indicate that the electro-mechanical part is healthy.

Figure 8B:
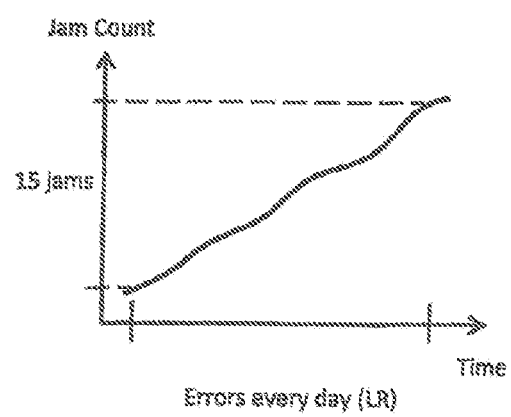
Figure 10:
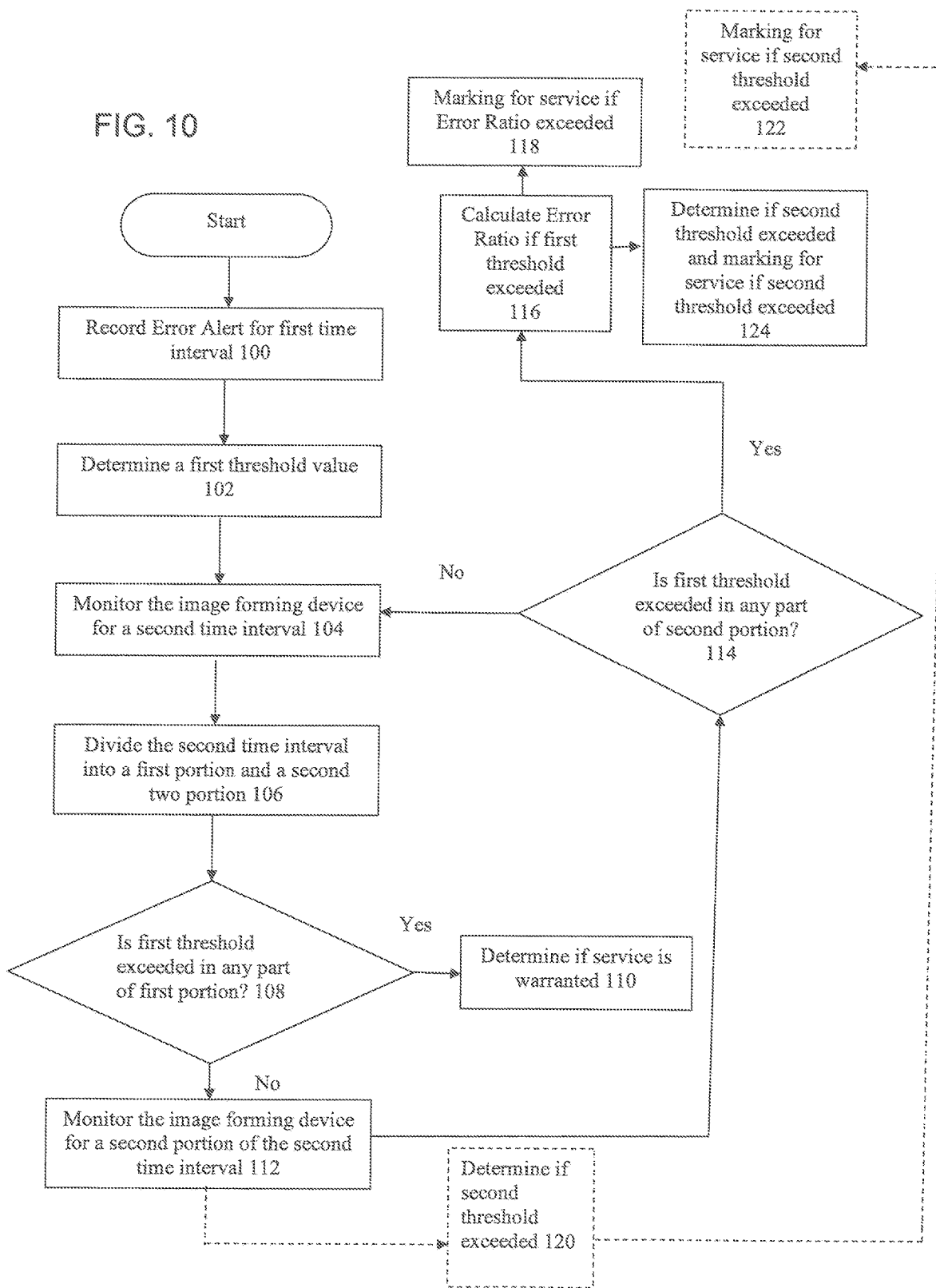
FIG. 10 is an exemplary embodiment of a flowchart depicting a method for diagnosing a component part of an image forming device according to one aspect of the present application.

However, as shown in FIGS. 7B and 8B, for the same electro-mechanical part, the monitoring server 24 may monitor that the electro-mechanical part may experience 3 paper jams on Day 1, 2 paper jams on Day 2, 5 paper jams on Day 3, 3 paper jams on Day 4 and 2 paper jams on Day 5. If the first threshold value is again 8, the monitoring server 24 may mark Day 1-5 as LR. Like the previous embodiment, a total of 15 paper jams may be recorded by the monitoring server 24. However, in this example, if the second threshold value is 4, the monitoring server 24 may recorded that the electro-mechanical part is unhealthy and may need to be serviced and/or replaced. Thus, the system 10 does not use the total number of incidents monitored and recorded to determine the health of the image forming device. Rather, the system 10 looks to see if there is a constant or monotonic error rate to determine the health of the image forming device 14.

In accordance with one embodiment, the monitoring server 24 may look to see a number of consecutive first time frames an LR is recorded to determine the health of the image forming device. For example, in this embodiment, let's say that the first time interval is a day and the second time interval is a month. During the first month, the monitoring server 24 may record ZR for Days 1-24 but LR for Days 25-30. During the start of the second month, the monitoring server may record the first eight days, Days 1-8 as LR. If the second threshold value is 10, for the first month, the monitoring server 14 may indicate that the electro-mechanical part is healthy. However, instead of waiting till the end of the second month, the monitoring server 14 may indicate that the electro-mechanical part is unhealthy and may need to be serviced and/or replaced since the monitoring server 14 has recorded 14 straight days of LR. Thus, in this embodiment, the monitoring server 14 may have a third threshold value. The third threshold value may be a number of consecutive first time intervals the LR is monitored and recorded. In general, the third threshold value may be larger than the second time interval.

The monitoring server 24 may check if the errors monitored and recorded happened on approximately the same rate every day. For example, the monitoring server 24 may show that a majority of the errors occur around 2:00 pm-2:30 pm. This may show that a majority of the workload on the image forming device 14 is done at a particular time. By looking at when the majority of the errors occur and the amount of working being performed during this timeframe, one may determine if a different model of the image forming device 14 may be better suited for a particular user. Thus, another value that may need to be considered in terms of an image forming device's health is a number of printed pages from a specific feeder unit. In a normal operational usage, a printing device could print from several hundred pages to several thousand pages in a day. Most of companies use printers in approximately the same work load daily basis and with same paper format. By monitoring the number of pages printed, one may see if the usage of the image forming device has been increasing and may be a cause for an increase in error alerts. Further, by monitoring the number of pages printed, one may see if the user is exceeding a capacity of the image forming device 14 and if a different model may be better suited for the user.

If service and/or replacement of a component part is determined by the monitoring server 24, the monitoring server 24 may signal a ticketing server 26. The ticketing server 26 may be used to generating a ticket in a human-readable format, wherein the ticket includes information on the determined issue. The ticketing server 26 may register the ticket and schedule a time for the image forming device 14 to be serviced. If the issue with the mage forming device 14 is rectified prior to being serviced, the ticketing server 26 may discard the ticket.

While number of expected errors is a set of positive numbers, we use a logistic regression to classify a device's health status with only two values: healthy and unhealthy. Logistic regression model maps a number of errors occurred within a specific time interval to device's health status.

Referring now to FIGS. 1-3 and 9-12, operation of the system 10 in accordance with another exemplary embodiment may be described. When the image forming device 14 experiences certain failures or abnormal situations such as an alarm condition, the image forming device 14 may generate an error alert. The error alert may include a failure code associated with the failure/abnormal situation along with additional information such as date, time and location of the occurrence. The above is given as an example and should not be seen in a limiting manner. Other information related to the failure/abnormal situation may be included other than those listed above.

The image forming device 14 may send the error alert to the monitoring server 24. The monitoring server 24 may record the error alert from the image forming device 14. The monitoring server 24 may analyze the error alert received as will be disclosed below. While the operation of the system 10 is disclosed as the image forming device 14 providing the error count to the monitoring server 24, in accordance with one embodiment, the image forming device 14 may store and analyze the error statistics within time intervals as disclosed below.

The monitoring server 24 may record and store the type of error and error location of each error message or alert. For example, the image forming device 14 may record a paper jam at a first paper tray, a paper jam at a second paper tray and a third paper jam at a feed door, the monitoring server 24 may record and store this information as three separate paper jams at three different locations and not as three total paper jams. The monitoring server 24 may record, store and analyze this information for a first predetermined time interval and tally this information as shown in 100. The first predetermined time interval may be a "sampling" time, wherein the monitoring server 24 may sample and collect data from the image forming device 14 as may be described below. The first predetermined time interval may be a day, two days of a week, or similar timeframes. The above is given as an example and should not be seen in a limiting manner.

The monitoring server 24 may calculate an incident count for a particular component part of the image forming device 14 for the first predetermined time interval. In accordance with one embodiment, the monitoring server 24 may calculate the incident count over multiple first-time intervals. For example, the monitoring server 24 may calculate the incident count over successive timeframes. Thus, if the first predetermined time interval is a day, the monitoring server 24 may calculate the incident count over two or more successive days. At the end of each first predetermined time interval, the monitoring server 24 may reset a counter so that the incident count starts again at zero.

The monitoring server 24 may analyze how the incident count varies from monitored timeframe to timeframe. By analyzing how the incident count increases from monitored timeframe to timeframe, the monitoring server 24 may determine a first threshold value as shown in 102. The first threshold value calculated may be defined as a number of errors recorded for a particular component part of the image forming device 14 for a predetermined timeframe which may indicate healthy operation. The first threshold value may differ for different image forming devices 14 as well as for different components. For example, image forming devices 14 which may offer higher quality images and faster printing speeds may have a lower threshold value than image forming devices 14 which may offer lower quality images and slower printing speeds.

The monitoring server 24 may continue to monitor the image forming device 14 for a second predetermined time period as shown in 104. The second predetermined time interval may be comprised of a plurality of first predetermined time intervals. The second predetermined time intervals may be a week, two weeks, 20 days, a month or similar timeframes.

During the second predetermined time interval, the monitoring server 24 may calculate an incident count for a particular component part of the image forming device 14 for each of the plurality of first predetermined time intervals forming the second predetermined time interval. At the end of each first predetermined time interval of the second predetermined time interval, the monitoring server 24 may reset the counter so that the incident count starts again at zero. Thus, if the first predetermined time interval is a day, and the second predetermined time interval is a month, the monitoring server 24 may calculate an incident count for a particular component part of the image forming device 14 for each day (first predetermined time interval) of the month (second predetermined time interval) and reset the counter at the end of each day so that the incident count starts again at zero as shown in FIG. 9.

The monitoring server 24 may record and store the type of incident and incident location. In the embodiment shown in FIG. 9, the monitoring server 24 may record and store the total number of incidents at different locations on the image forming device 14 for the plurality of first predetermined time intervals that form the second predetermined time interval. In the present embodiment, three different electromechanical part locations (i.e., Location 1, Location 2 and Location 3) are being monitored. However, this is just being shown as an example and should not be seen in a limiting manner.

The server 24 may divide the second predetermined time interval into two different timeframes, a first portion of the second predetermined time interval and a second portion of the second predetermined time interval as shown in 106. The first portion of the second predetermined time interval and the second portion of the second predetermined time interval do not have to be equal in duration. For example, as may be seen in FIG. 9, the first portion of the second predetermined time interval may be three weeks (i.e., days 1-21) and the second portion of the second predetermined time interval may be a week (i.e., days 22-28). The server 24 may divide the second predetermined time interval into two different timeframes in order to determine if there is a "sudden" increase in the number of incident counts being monitored between the first portion of the second predetermined time interval and the second portion of the second predetermined time that may indicate that the image forming device 14 may need servicing.

In accordance with one embodiment, to determine a "sudden" increase in the number of incident counts, the server 24 may monitor the image forming device 14 for the first portion of the second predetermined time interval. The monitoring server 24 may calculate an incident count for a particular component part of the image forming device 14 for each of the plurality of first predetermined time intervals forming the first portion of the second predetermined time interval. At the end of the first portion of the second predetermined time interval, the monitoring server 24 may determine if the incident count at each location and then determine if the first threshold value has been exceeded for each of the plurality of first predetermined time intervals forming the first portion of the second predetermined time interval as shown in 108. If the first threshold value has been exceeded for any of the plurality of first predetermined time intervals forming the first portion of the second predetermined time interval, the server 24 may determine if service may be warranted as shown in 110.

If the first threshold value has not been exceeded for any of the plurality of first predetermined time intervals forming the first portion of the second predetermined time interval, the server 24 may monitor the image forming device 14 for the second portion of the second predetermined time interval as shown in 112. The monitoring server 24 may calculate an incident count for a particular component part of the image forming device 14 for each of the plurality of first predetermined time intervals forming the second portion of the second predetermined time interval.

At the end of the second portion of the second predetermined time interval, the monitoring server 24 may determine if the incident count at each location and then determine if the first threshold value has been exceeded for any of the plurality of first predetermined time intervals forming the second portion of the second predetermined time interval as shown in 114. If the first threshold value has not been exceeded for any of the plurality of first predetermined time intervals forming the second portion of the second predetermined time interval, the server 24 may monitor the image forming device 14 may return and monitor for the first portion of the second predetermined time interval as shown in 104.

If the first threshold value has been exceeded for any of the plurality of first predetermined time intervals forming the second portion of the second predetermined time interval, the server 24 may calculate an error ratio to determine if service may be warranted as shown in 116. In accordance with one embodiment, the error ratio may be calculated as follows. The server 24 may calculate an average incident count at the location where the first threshold value has been exceeded for the plurality of first predetermined time intervals forming the second portion of the second predetermined time interval. The server 24 may determine the maximum incident count recorded at the location where the first threshold value has been exceeded for the plurality of first predetermined time intervals forming the second portion of the second predetermined time interval. The server 24 may then calculate the error ratio between the average incident count at the location where the first threshold value has been exceeded for the plurality of first predetermined time intervals forming the second portion of the second predetermined time interval and the maximum incident count recorded at the location where the first threshold value has been exceeded for the plurality of first predetermined time intervals forming the second portion of the second predetermined time interval. If the error ratio is above an error ratio threshold, the server 24 may indicate that service may be warranted for the location in question as shown in 118.

An example of the above may be shown in FIG. 9. FIG. 9 shows the error count for three different locations on image forming device 14 monitored by the server 24. In the present embodiment, the second predetermined time interval is four weeks (28 days, Day 1-28). The second predetermined time interval may be divided into a first portion which is three weeks (21 days, Day 1-21) and a second portion which is one week (7 days, Day 22-28).

In the present embodiment, the first threshold level may be 5. At the end of the first portion of the second predetermined time interval (Days 1-21), the monitoring server 24 may determine if the incident count at any location has exceeded the first threshold value (i.e., 5) for any of the plurality of first predetermined time intervals (Days 1-21) forming the first portion of the second predetermined time interval. If the first threshold level (i.e., 5) has not been exceeded at any location during the plurality of first predetermined time intervals (Days 1-21) forming the first portion of the second predetermined time interval, the server 24 may monitor the image forming device 14 for the second portion of the second predetermined time interval (Days 22-28) to see if the first threshold value has been exceeded for any of the plurality of first predetermined time intervals forming the second portion of the second predetermined time interval (Days 22-28). In the present embodiment, on Day 28 at Location 1, the incident count exceeded the first threshold value (i.e., 5). Thus, the server 24 may now calculate an error ratio to determine if service may be warranted. The error ratio is the ratio between the average incident count at the location where the first threshold value has been exceeded for the plurality of first predetermined time intervals forming the second portion of the second predetermined time interval and the maximum incident count recorded at the location where the first threshold value has been exceeded for the plurality of first predetermined time intervals forming the second portion of the second predetermined time interval. If the average incident count at Location 1 for Days 1-21 is 2.5 incidents and the maximum incident count recorded at Location 1 for Days 22-28 is 10, the error ratio may be calculated as 10/2.5=4. If the error ratio threshold is 4 or less, then the server 24 may recommend service. However, if the error ratio threshold is more than 4, the server 24 may not recommend service. If the error ratio threshold is 2, for example, the error ratio is over the threshold and the server 24 may recommend service. However, if the error ratio threshold is 5, for example, the server 24 may not recommend service.

The error ratio may be used to see if there is a sudden increase in the incident count. Small changes in the incident count, even if above the first threshold value may not warrant servicing. For example, if the average incident count at Location 1 for Days 1-21 is 4 (i.e. 4 incidents recorded every day at Location 1 for Days 1-21) and the maximum incident count recorded at Location 1 for Days 22-28 is 5, the error ratio would be 5/4=1.25 which is below the error ratio threshold and would indicate that the increase in incident count may not be serious.

In accordance with another embodiment, in order to determine if an increase in incident count is serious or not, a threshold ratio may be calculated. The threshold ratio may be determined as follows. First, the server 24 may determine: X=number of errors at a specific location from the beginning when the image forming device 14 was installed and started to be used. The server 24 may determine: Y=total number of errors at the specific location during the second predetermined time interval (Days 1-28). The threshold ratio may be Threshold $A<=(X-Y)/(X-1)<=$Threshold B (e.g., A=0.001, B=0.97). By calculating the threshold ratio as shown above, the server 24 may check if the incident count has gone up recently or not, so that the server 24 may identify sudden increase in the incident count.

The monitoring server 24 may determine if the incident count at each location exceeds a second threshold value for any of the plurality of first predetermined time intervals forming the second portion of the second predetermined time interval. The monitoring server 24 may determine if the incident count at each location exceeds a second threshold value in addition to determining if the incident count at each location exceeds the first threshold value as shown in 124. As shown in 124, if the second threshold is exceeded, the monitoring server 24 may request service if the second threshold is exceeded. Alternatively, instead of determining if the incident count at each location exceeds the first threshold value, the monitoring server 24 may determine if the incident count at each location exceeds the second threshold value as shown in 120. The second threshold value may be based on a manufacturer's suggested value, can be dynamically changed based on historical data or may be based on other criteria. Although this is not explicitly illustrated in FIG. 10, the step of determining if the incident count at each location for any of the plurality of first predetermined time intervals forming the second portion of the second predetermined time interval exceeds the second threshold value is performed in addition to (for example after performing) the step of determining if the incident count at each location for any of the plurality of first predetermined time intervals forming the second portion of the second predetermined time interval exceeds the first threshold value, the same step depicted as the step 124 is performed after the step 114 as shown in FIG. 11. If the second threshold is exceeded, the error ration is calculated as shown in 126. If the threshold ratio is exceeded, the server 24 may request service as shown in 128.

If the second threshold value has been exceeded for any of the plurality of first predetermined time intervals forming the second portion of the second predetermined time interval, the server 24 may request service as shown in 122. The service may be requested once the server 24 determines that the second threshold value has been exceeded. Additionally, or alternatively, in order to determine if an increase in incident count is serious or not, the threshold ratio may be calculated as disclosed above and shown in 124 and shown in FIG. 12. If the threshold ratio is exceeded, the server 24 may request service as shown in 126.

In accordance with one embodiment, the second threshold value is larger than the first threshold value. In this manner, the server 24 may be trying to detect a sudden increase in the number of errors, where a larger number of error take place more recently than a few days/weeks. Sudden increases in the number of errors may indicate that a component in the image forming device 14 may need replacement. However, if the second threshold value has not been exceeded for any of the plurality of first predetermined time intervals forming the second portion of the second predetermined time interval, the server 24 may return and monitor for the first portion of the second predetermined time interval as shown in 104.

The foregoing description is illustrative of particular embodiments of the invention, but is not meant to be a limitation upon the practice thereof. The following claims, including all equivalents thereof, are intended to define the scope of the invention.

What is claimed is:

1. A method to diagnose an electro-mechanical part on an image forming device comprising:
    determining an incident count during a first time interval for the electro-mechanical part;
    determining a first threshold level for the first time interval;
    monitoring the electro-mechanical part for a second time interval, wherein the second time interval is a plurality of first time intervals;
    determining if the incident count during a first portion of the second time interval for the electro-mechanical part is equal to or less than the first threshold level;
    determining if the incident count during a second portion of the second time interval for the electro-mechanical part exceeds the first threshold level when the incident count for the first portion of the second time interval is equal to or less than the first threshold level for the electro-mechanical part;
    determining a maximum incident count for the second portion of the second time interval that exceeds the first threshold for the electro-mechanical part;
    calculating an error ratio between an average incident count of the first portion of the second time interval and the maximum incident count of the second portion of the second time interval; and
    marking the electro-mechanical part as needing to be one of repaired or serviced when the error ratio exceeds an error ratio threshold level.

2. The method of claim 1, wherein determining if the incident count for a first portion of the second time interval for the electro-mechanical part exceeds the first threshold level comprises determining the incident count for each first time interval forming the first portion of the second time interval for the electro-mechanical.

3. The method of claim 2, wherein the incident count is reset to zero at beginning of each first time interval forming the first portion of the second time interval.

4. The method of claim 1, wherein determining a maximum incident count for the second portion of the second time interval comprises:
    determining the incident count for each first time interval forming the second portion of the second time interval; and
    selecting a first time interval forming the second portion of the second time interval having a highest incident count.

5. The method of claim 4, wherein the incident count is reset to zero at beginning of each first time interval forming the second portion of the second time interval.

6. The method of claim 1, wherein determining an incident count for a first time interval for the electro-mechanical part comprises:
    calculating the incident count for a plurality of first time intervals; and
    resetting the incident count to zero after each of the plurality of first time intervals.

7. The method of claim 1, wherein the first portion of the second time interval and the second portion of the second time interval are of different time durations.

8. The method of claim 1, comprising:
    determining if the incident count during a second portion of the second time interval for the electro-mechanical part exceeds a second threshold level; and
    marking the electro-mechanical part as needing to be one of repaired or serviced when the second threshold level is exceeded.

9. A method to diagnose an electro-mechanical part on an image forming device comprising:
    determining an incident count during a first time interval for the electro-mechanical part;
    determining a first threshold level for the first time interval;
    monitoring the electro-mechanical part for a second time interval, wherein the second time interval is a plurality of first time intervals;
    determining if the incident count during a first portion of the second time interval for the electro-mechanical part is equal to or less than the first threshold interval;
    determining if the incident count for a second portion of the second time interval for the electro-mechanical part exceeds the first threshold interval when the incident count for the first portion of the second time interval is equal to or less than the first threshold interval for the electro-mechanical part;

determining a maximum incident count for the second portion of the second time interval when the incident count for the second portion of the second time interval exceeds the first threshold interval for the electro-mechanical part;

calculating an error ratio to determine an increase in the incident count from the first portion of the second time interval and the second portion of the second time interval is above an error ratio threshold; and marking the electro-mechanical part as needing to be one of repaired or serviced when the error ratio exceeds the error ratio threshold level;

wherein the error ratio is a ratio between an average incident count of the first portion of the second time interval and a maximum incident count of the second portion of the second time interval.

10. The method of claim 9, wherein determining if the incident count for a first portion of the second time interval for the electro-mechanical part exceeds the first threshold level comprises determining the incident count for each first time interval forming the first portion of the second time interval for the electro-mechanical part.

11. The method of claim 10, wherein the incident count is reset to zero at beginning of each first time interval forming the first portion of the second time interval.

12. The method of claim 9, wherein determining a maximum incident count for the second portion of the second time interval comprises:

determining the incident count for each first time interval forming the second portion of the second time interval; and selecting a first time interval forming the second portion of the second time interval having a highest incident count.

13. The method of claim 12, wherein the incident count is reset to zero at beginning of each first time interval forming the second portion of the second time interval.

14. The method of claim 9, wherein determining an incident count for a first time interval for the electro-mechanical part comprises:

calculating the incident count for a plurality of first time intervals; and resetting the incident count to zero after each of the plurality of first time intervals.

15. The method of claim 9, wherein the first portion of the second time interval and the second portion of the second time interval are of different time durations.

16. The method of claim 9, comprising:

determining if the incident count during a second portion of the second time interval for the electro-mechanical part exceeds a second threshold level; and marking the electro-mechanical part as needing to be one of repaired or serviced when the second threshold level is exceeded.

17. A method to diagnose an electro-mechanical part on an image forming device comprising:

determining an incident count during a first time interval for the electro-mechanical part;

determining a first threshold level for the first time interval;

monitoring the electro-mechanical part for a second time interval, wherein the second time interval is a plurality of first time intervals;

determining if the incident count during a first portion of the second time interval for the electro-mechanical part exceeds the first threshold by determining the incident count for each first time interval forming the first portion of the second time interval for the electro-mechanical, wherein the incident count is reset to zero at beginning of each first time interval forming the first portion of the second time interval;

determining if the incident count during a second portion of the second time interval for the electro-mechanical part exceeds the first threshold when the incident count for the first portion of the second time interval fails to exceed the first threshold for the electro-mechanical part;

determining the incident count during each first time interval forming the second portion of the second time interval, wherein the incident count is reset to zero at the beginning of each first time interval forming the second portion of the second time interval;

selecting one of the first time interval forming the second portion of the second time having a highest incident count greater than the first threshold;

calculating an error ratio between an average incident count of the first portion of the second time interval and maximum incident count of the second portion of the second time interval; and marking the electro-mechanical part as needing to be one of repaired or serviced when the error ratio exceeds an error ratio threshold level.

18. The method of claim 17, wherein determining an incident count for a first time interval for the electro-mechanical part comprises:

calculating the incident count for a plurality of first time intervals; and resetting the incident count to zero after each of the plurality of first time intervals.

19. The method of claim 17, comprising:

determining if the incident count during a second portion of the second time interval for the electro-mechanical part exceeds a second threshold level; and marking the electro-mechanical part as needing to be one of repaired or serviced when the second threshold level is exceeded.

* * * * *